THERMOPLASTIC RESIN COMPOSITION COMPRISING POLYCARBONATES AND POLYARYLENE ESTERS

Hiroshi Kishikawa, Toyonaka, Kiyoshi Yasuno, Ibaragi, Shuji Kitamura, Toyonaka, Katsuji Ueno, Hirakata, and Haruo Inoue and Nobuhiro Toyota, Takatsuki, Japan, assignors to Sumitomo Chemical Company, Limited, Osaka-fu, Japan
No Drawing. Filed Mar. 8, 1972, Ser. No. 232,919
Claims priority, application Japan, Mar. 8, 1971, 46/12,656
Int. Cl. C08g 39/10
U.S. Cl. 260—860                                4 Claims

ABSTRACT OF THE DISCLOSURE

A thermoplastic resin composition of polycarbonate improved in impact strength and heat deformation resistance which comprises 1 to 99% by weight of polycarbonate resin and 99 to 1% by weight of polyarylene ester on the basis of the total weight of the composition.

---

The present invention relates to a thermoplastic resin composition of polycarbonate improved in impact strength and heat deformation resistance.

As is well known, polycarbonate (hereinafter referred to as "PC") is a transparent resin excellent in mechanical and thermal properties, which is widely used as the so-called "engineering plastics." In order to increase its industrial value, attempts have been made to improve the impact strength and the heat deformation resistance. As a general procedure for increasing the impact strength of various resins, the blending of a rubbery material is known. As the result of such blending, however, the heat deformation resistance is usually decreased. On the other hand, the incorporation of a plastic component having a higher heat deformation resistance into a resin material is also known for improvement of the heat deformation resistance of the resin material. However, such incorporation usually results in the decrease of the impact strength. Thus, the simultaneous improvement of the impact strength as well as the heat deformation resistance has thus been considered to be difficult.

As the result of the extensive study, it has now been successfully realized to improve not only the impact strength but also the heat deformation resistance of PC by blending polyarylene ester (hereinafter referred to as "APC") therein.

According to the present invention, there is provided a thermoplastic resin composition comprising about 1 to 99% by weight of PC and about 99 to 1% by weight of APC on the basis of the total weight of the composition. When the amount of APC is out of the said range, the improving effect of the impact strength is much reduced. When the amount of APC is from about 5 to 80% by weight, the resulting composition is excellent not only in the impact strength but also in the heat deformation resistance.

The said essential components in the composition of the invention have a good compatibility so that no separation is seen in the course of processing.

As PC, which is one of the essential components in the composition of the invention, there is used 4,4'-dihydroxydiarylalkane polycarbonate obtained from 4,4'-dihydroxydiphenylalkane (e.g. bis(4 - hydroxyphenyl) methane, bis(4-hydroxyphenyl)ethane, 2,2-(4-hydroxyphenyl)propane, bis(4-hydroxy - 3,5 - dichlorophenyl) methane, 2,2-(4-hydroxy - 3,5 - dimethylphenyl)propane, bis(4 - hydroxyphenyl)phenylmethane and phosgene or diphenyl carbonate.

APC, which is the other essential component, is a polyester synthesized from a divalent phenol or its derivative and an aromatic dibasic acid or its derivative.

The divalent phenol is represented by the following formula:

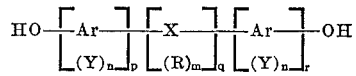

wherein Ar is an aromatic ring (e.g. phenylene, biphenylene, naphthylene), R is hydrogen, alkyl (e.g. methyl, ethyl), haloalkyl (e.g. chloromethyl, chloroethyl, bromomethyl), aryl (e.g. phenyl, naphthyl), haloaryl (e.g. chlorophenyl, bromophenyl), aralkyl, (e.g. benzyl, phenylethyl), haloaralkyl (e.g. chlorobenzyl), alkyl-substituted aryl (e.g. tolyl, xylyl), alkyl-substituted haloaryl (e.g. chloromethylphenyl, bromomethylphenyl), cycloalkyl (e.g. cyclohexyl, cycloheptyl) or halocycloalkyl (e.g. chlorocyclopentyl, chlorocyclohexyl), X is alkylene (e.g. methylene, ethylene, propylene), alkylidene (e.g. ethylidene, propylidene, isopropylidene), a chain of two or more alkylenes or alkylidenes linked through an aromatic ring, a t-amino group, an oxygen atom, a carbonyl group or a sulfur-containing group (e.g. thio, sulfoxy, sulfone), an alicyclic group, a sulfur-containing group (e.g. thio, sulfoxy, sulfone), an oxygen atom, a carbonyl group or a t-amino group, Y is halogen, nitro or the group represented by R' or OR' (R' being the same as R), $m$ is 0 or an integer not more than the number of hydrogen atoms replaceable on X, $n$ is 0 or an integer not more than the number of hydrogen atoms replaceable on Ar, $p$ is an integer of 1 or more, $q$ is 0 or 1 and $r$ is 0 or an integer of 1 or more, $r$ being not 0 when $q$ is 1.

In the above formula, when two or more substituents Y are present, they may be the same or different from each other. That is the same in case of the substituent R or R'. The hydroxyl group on the aromatic ring may be present at any position to the substituent Y, i.e. the ortho, meta or para position.

Examples of the divalent phenol include bis(4-hydroxyphenyl)-methane, bis(4 - hydroxy - 3 - methylphenyl)-methane, bis(4 - hydroxy - 3,5 - dichlorophenyl)-methane, bis(4 - hydroxy - 3,5 - dibromophenyl)-methane, bis(4-hydroxy - 3,5 - difluorophenyl)-methane, bis(4-hydroxyphenyl) - ketone, bis(4 - hydroxyphenyl) - sulfide, bis(4-hydroxyphenyl) - sulfone, 4,4' - dihydroxydiphenyl ether, 1,1 - bis(4 - hydroxyphenyl) - ethane, 2,2-bis(4-hydroxyphenyl) - propane, 2,2 - bis(4 - hydroxy - 3 - methylphenyl) - propane, 2,2 - bis(4 - hydroxy-3-chlorophenyl)-propane, 2,2 - bis(4 - hydroxy - 3,5 - dichlorophenyl)-propane, 2,2 - bis(4 - hydroxynaphthyl) - propane, bis(4-hydroxyphenyl)-phenylmethane, bis(4 - hydroxyphenyl)-diphenylmethane, bis(4 - hydroxyphenyl) - 4' - methylphenylmethane, 1,1 - bis(4 - hydroxyphenyl) - 2,2,2-trichloroethane, bis(4 - hydroxyphenyl) - (4' - chlorophenyl)-methane, 1,1 - bis(4 - hydroxyphenyl) - cyclohexane, bis(4 - hydroxyphenyl) - cyclohexylmethane, 4,4'-dihydroxydiphenyl, 2,2' - dihydroxydiphenyl, 2,6 - dihydroxydinapththalene, hydroquinone, resorcinol, 2,6-dihydroxytoluene, 2,6-dihydroxychlorobenzene, 3,6-dihydroxytoluene, etc. These divalent phenols may be used alone or in combination.

The divalent phenol may be used in the form of a diester such as the dialkyl ester or diphenyl ester. Such diester derivatives may be also used alone or in combination.

The aromatic dibasic acid is represented by the following formula:

HOOC—Ar'—COOH wherein Ar' is arylene (e.g. o-phenylene, m-phenylene, p-phenylene, naphthylene) substituted or not with alkyl or halogen. The dibasic acids may be used alone or in combination.

The dibasic acid may be used in the form of a dichloride or diester such as the dialkyl ester or diphenyl ester. Such derivatives may be also used alone or in combination.

The preparation of the APC from the divalent phenol or its derivative and the aromatic dibasic acid or its derivative may be executed by interfacial condensation polymerization, solution condensation polymerization, melt condensation polymerization or the like.

The composition of the present invention may include any additives to be conventionally incorporated in PC such as dyestuffs, pigments, fillers, stabilizers and the like.

The composition of the invention can be uniformly blended by the solution blending method or by the aid of a conventional mixing machine such as two rolls, a Banbury mixer or an extruder.

Practical and presently preferred embodiments of the present invention are illustratively shown in the following examples wherein the physical constants are determined as follows:

Vicat softening point

A test piece of 3 mm. in thickness is charged with a load of 1 kg., and the temperature is gradually raised at a rate of 0.8° C./min. When a needle penetrates into the test piece to the depth of 1 mm., the temperature is recorded as the Vicat softening point.

Impact strength

Indicated by the Izod impact strength obtained according to ASTM D256–56T.

Tensile strength

Determined by tensioning a test piece shaped in a dumbbell at a rate of 10 mm./min. using a tensile testing machine.

EXAMPLE 1

PC (intrinsic viscosity in chloroform determined at 25° C., 0.6 dl./g.) and APC having the following unit structure:

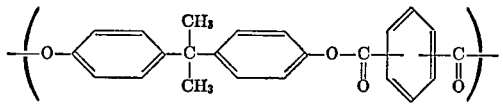

(p-substituted compound, 50 mol percent; m-substituted compound, 50 mol percent; intrinsic viscosity in chloroform determined at 25° C., 0.55 dl./g.) are roll kneaded at 280° C. for 10 minutes and press molded. The molded product is subjected to a determination of the physical constants. The results are shown in Table 1.

TABLE 1

| APC content (percent by weight) | Physical properties | | | | |
|---|---|---|---|---|---|
| | Izod impact strength (kg.-cm./cm.²) | Vicat softening point (° C.) | Tensile characteristics | | |
| | | | Yield strength (kg.-cm./cm.²) | Breaking strength (kg.-cm./cm.²) | Elongation (percent) |
| 0 | 8.8 | 148 | 610 | 500 | 13 |
| 1 | | 149 | 650 | 580 | 85 |
| 5 | 9.8 | 150 | 660 | 580 | 83 |
| 10 | 10.0 | 153 | 650 | 580 | 84 |
| 30 | 12.8 | 160 | 660 | 590 | 81 |
| 50 | 11.9 | 170 | 680 | 590 | 80 |
| 70 | 10.0 | 176 | 690 | 590 | 80 |
| 90 | 10.5 | 180 | | | |

From the above Table, it is understood that the heat deformation resistance and the impact strength of PC are improved by incorporation of APC therein. The elongation is increased with the incorporation of APC, and it corresponds to the increase of the Izod impact strength caused by the incorporation of APC. It is notable that all the compositions are tarnsparent in spite of the reference in refractive index between APC and PC.

EXAMPLE 2

PC (intrinsic viscosity in chloroform determined at 25° C., 0.6 dl./g.) and APC having the following unit structure:

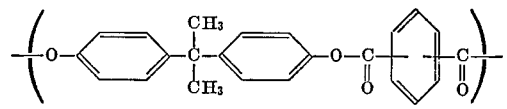

(p-substituted compound, 55 mol percent; m-substituted compound, 45 mol percent; intrinsic viscosity in chloroform determined at 25° C., 0.66 dl./g.) are dissolved in methylene chloride. After the solution is stirred well, methanol is added thereto. The precipitated powder is collected, dried and press molded. The molded product is subjected to determination of the physical constants. The results are shown in Table 2.

TABLE 2

| APC content (percent by weight) | Physical properties | |
|---|---|---|
| | Izod impact strength (kg.-cm./cm.²) | Vicat softening point (° C.) |
| 0 | 8.8 | 148 |
| 30 | 10.5 | 167 |
| 50 | 11.0 | 181 |
| 70 | 11.5 | 195 |

From the above table, it is understood that the heat-deformation resistance and the impact strength of PC are improved by incorporation of APC therein.

EXAMPLE 3

In this example, there is used as APC a polyester derived from 2,2-bis(4-hydroxyphenyl)-propane (25 mol percent), 2,2-bis(4-hydroxy-3,5-dimethylphenyl)-propane (25 mol percent), isophthaloyl chloride (20 mol percent), terephthaloyl chloride (25 mol percent) and phthaloyl chloride (5 mol percent) and having an intrinsic viscosity of 0.75 dl./g. when determined in chloroform at 25° C.

PC (intrinsic viscosity in chloroform determined at 25° C., 0.6 dl./g.) (50% by weight) and APC (50% by weight) are dissolved in methylene chloride. After the solution is stirred well, methanol is added thereto. The precipitated powder is collected, dried and press molded. The Izod impact strength and the Vicat softening point of the molded product are 11.7 kg.-cm./cm.² and 189° C., respectively.

EXAMPLE 4

In this example, there is used as APC a polyester having the following unit structure:

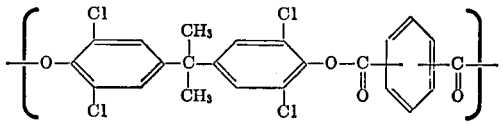

derived from 2,2 - (4 - hydroxy - 3,5 - dichlorophenyl)-propane, isophthaloyl chloride and terephthaloyl chloride, the molar ratio of isophthaloyl chloride and terephthaloyl chloride being 70:30, and showing an intrinsic viscosity of 0.70 dl./g. when determined in chloroform at 25° C.

PC (intrinsic viscosity in chloroform determined at 25° C., 0.6 dl./g.) (30% by weight) and APC (70% by weight) are dissolved in methylene chloride. After the solution is stirred well, methanol is added thereto. The precipitated powder is collected, dried and press molded. The Izod impact strength and the Vicat softening point of the molded product are 12.0 kg.-cm./cm.² and 208° C., respectively.

EXAMPLE 5

In this example, there is used as APC a polyester having the following unit structure:

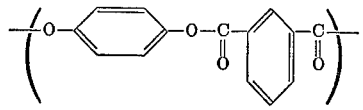

derived from hydroquinone and isophthaloyl chloride and showing an intrinsic viscosity of 0.61 dl./g. when determined in trichloroacetic acid at 75° C.

PC (intrinsic viscosity in chloroform determined at 25° C., 0.6 dl./g.) (90% by weight) and APC (10% by weight) are blended in solution. The Izod impact strength and the Vicat softening point of the molded product therefrom are 10.5 kg.-cm./cm.² and 158° C., respectively.

What is claimed is:

1. A thermoplastic resin composition which comprises about 1 to 99% by weight of a polycarbonate resin derived from the reaction of a divalent phenol and a carbonate precursor and about 99 to 1% by weight of a polyarylene ester derived from the reaction of a divalent phenol and an aromatic dibasic acid, said percentages being based upon the total weight of the composition.

2. The thermoplastic resin composition according to claim 1, wherein the polyarylene ester is present in said composition in an amount of about 5 to 80% by weight.

3. The thermoplastic resin composition according to claim 1, wherein the polycarbonate resin is obtained from 4,4'-dihydroxydiphenylalkane and phosgene or diphenyl carbonate.

4. The thermoplastic resin composition according to claim 1, wherein the polyarylene ester is a polyester prepared from a divalent phenol of the formula:

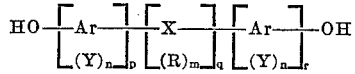

wherein Ar is an aromatic ring, R is hydrogen, alkyl, haloalkyl, aryl, haloaryl, aralkyl, haloaralkyl, alkyl-substituted aryl, alkyl-substituted haloaryl, cycloalkyl or halocycloalkyl, X is alkylene, alkylidene, a chain of two or more alkylenes or alkylidene linked through an aromatic ring, a t-amino group, an oxygen atom, a carbonyl group or a sulfur-containing group, an alicyclic group, a sulfur-containing group, an oxygen atom, a carbonyl group or a t-amino group, Y is halogen, nitro or the group represented by R' or OR' (R' being the same as R), m is 0 or an integer not more than the number of hydrogen atoms replaceable on X, n is 0 or an integer not more than the number of hydrogen atoms replaceable on Ar, p is an integer of 1 or more, q is 0 or 1 and r is 0 or an integer of 1 or more, r being not 0 when q is 1, or a diester derivative thereof, and an aromatic dibasic acid of the formula:

HOOC—Ar'—COOH wherein Ar' is arylene substituted or not with alkyl or halogen or a dichloride or diester derivative thereof.

References Cited
UNITED STATES PATENTS 3,365,517  1/1968  Barth _____ 260—860
3,704,279  11/1972  Ismail _____ 260—47 C WILLIAM H. SHORT, Primary Examiner E. WOODBERRY, Assistant Examiner U.S. Cl. X.R.

260—47 R